March 14, 1961
M. WARE ET AL
2,974,740
TRACKED VEHICLE
Filed Feb. 20, 1957
2 Sheets-Sheet 1
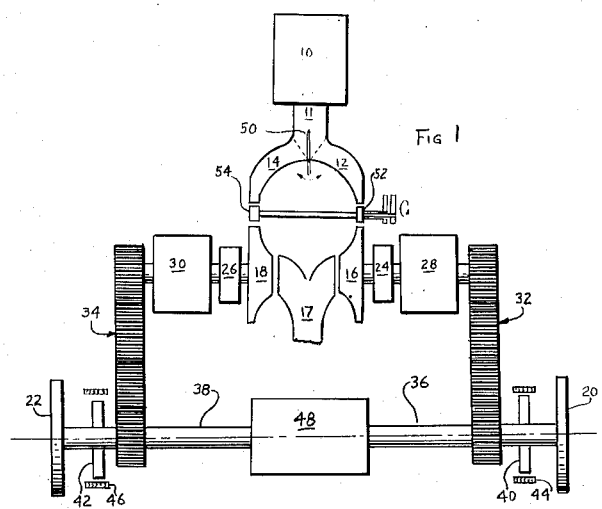
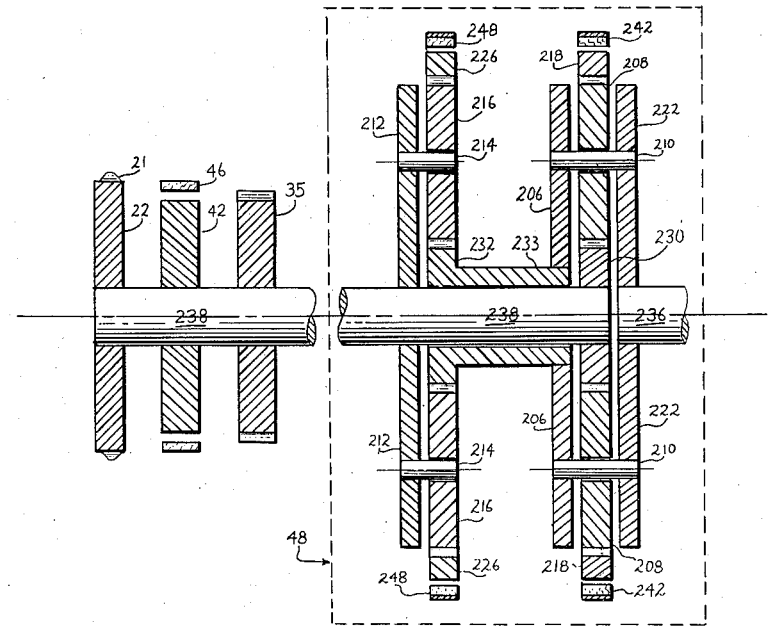
INVENTORS
*MARSDEN WARE
DOUGLAS HUGHSON*
BY
*Clifford L. Sadler*
ATTORNEY

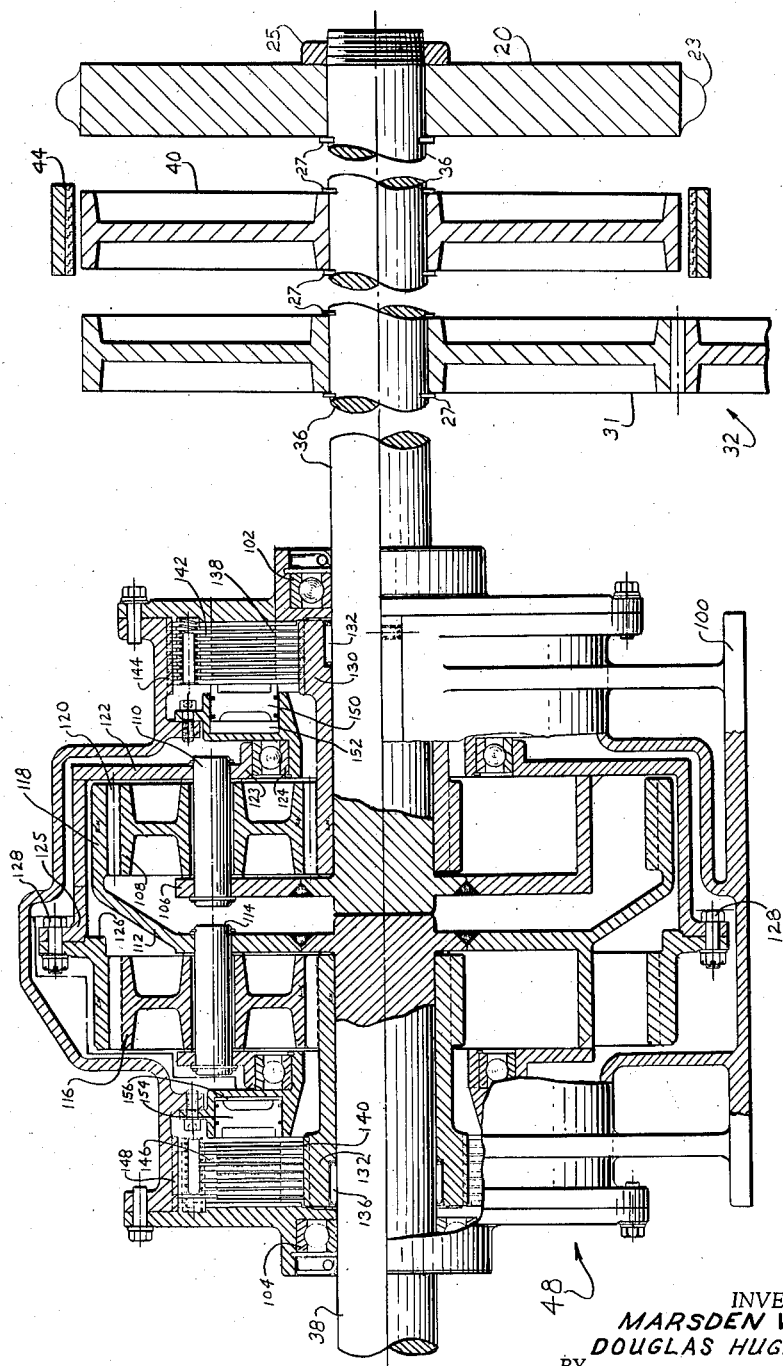

United States Patent Office 2,974,740
Patented Mar. 14, 1961

2,974,740

TRACKED VEHICLE

Marsden Ware, Birmingham, and Douglas Hughson, Royal Oak, Mich., assignors to Studebaker-Packard Corporation, South Bend, Ind., a corporation of Michigan Filed Feb. 20, 1957, Ser. No. 641,378

7 Claims. (Cl. 180—6.48)

The present application relates to tracked vehicles and more particularly to a direction control mechanism for tracked vehicles.

Mechanisms for steering tracked vehicles can be classified generally as being of the regenerative or non-regenerative types. In non-regenerative steering, some device is employed to slow down the inner track, which then drags on the ground, resulting in a slewing moment being exerted on the vehicle, causing it to turn. However, this action also results in a deceleration of the vehicle even to the point of bringing it to rest if the track is kept locked for a long enough period. Such a device is commonly in the form of a clutch for disengaging engine power from the desired track, used in conjunction with a brake to slow down the track. This is usually referred to as clutch and brake steering. Aside from the obvious disadvantages of vehicle deceleration in a turn, there are the troublesome brake problems resulting from the large powers dispatched within the brake. When it is considered that the class of vehicles with which this system is associated may weigh as much as sixty tons or more, as in the case of heavy military tanks, it can be appreciated that disadvantages of clutch and brake steering are of a very high order.

When a regenerative steering mechanism is employed to turn the vehicle the power fed into the ground by the inside track is transferred to the outside track to aid in negotiating the turn so that the deceleration problem is minimized and the brake problem is eliminated. To prevent any deceleration at all some additional engine power must be supplied to replace that expended in slewing the tank; however, the power required is usually of a very low order and available from the engine even at near maximum vehicle speed.

Therefore, in view of the foregoing, it is an object of the present invention to supply an improved steering mechanism for tracked vehicles whereby the energy expended in turning the vehicle is kept to a minimum, and the vehicle's speed will not be retarded.

A further object of the present invention is to provide a directional control system for a tracked vehicle providing several means of steering the vehicle which may be used singly or in combination.

These and further objects of the present invention will become more apparent from the following detailed description and the accompanying drawings wherein:

Figure 1 is a schematic drawing of the propulsion and steering means for a tracked vehicle;

Figure 2 is a sectional view of the regenerative steering gear mechanism shown in Figure 1; and Figure 3 is a sectional view of a modification of the unit of Figure 2.

Referring now to the drawings and particularly to Figure 1 for a detailed description of the present invention. The basic components of the propulsion system for the vehicle include a hot gas generator 10, outlets 11, 12 and 14, power turbines 16 and 18, reduction gears 24 and 26, transmissions 28 and 30, drive gear trains 32 and 34, and drive wheels 20 and 22. It will be noted from the drawing that separate power turbines 16 and 18 and their dependent drive components are provided in parallel for independent propulsion of each drive wheel.

A hot gas generator 10 is disclosed in association with an outlet 11 and ducting 12 and 14 for the supplying of the working fluid to the power turbines 16 and 18. The gas generator 10 may be of any type such as a free piston engine or a conventional compressor, combustion chamber, compressor turbine gasifier. The gas outlet for the turbines 16 and 18 is a waste gas conduit 17. The output shafts of the turbines 16 and 18 rotate at very high speeds and it is, therefore, necessary that reduction gears 24 and 26 be interposed in the system at this point to obtain the desired proper shaft speed. The type of reduction gear unit is not critical, however, planetary gearing could be used to advantage. The shaft output of the reduction gear units 24 and 26 are then fed into multi-speed transmissions 28 and 30 which provide variable speed and torque control. Drive gear trains 32 and 34 further reduce the shaft speed and transmit the power to the axles or drive shafts 36 and 38 which have splined to their outer ends the previously mentioned sprocket drive wheels 20 and 22. The drive wheels 20 and 22 directly engage the tracks (not shown) of the vehicle for propelling it in a well known manner. The aforedescribed system provides independent power turbines and drive lines for each of the driving wheels 20 and 22.

Between the gas generator 10 and the turbines 16 and 18, means are provided to direct and control the flow of gases to the turbines 16 and 18. A vane-type valve 50 is disposed at the junction in the Y-shaped outlet ducting 11. This controllable valve 50 allows the selection of the proportionate distribution of gas between the turbines 16 and 18 and thus the distribution of power by the turbines 16 and 18.

Turbine inlet nozzles 52 and 54 are provided at the inlet side of the turbines 16 and 18 to control the direction which the gases impinge upon the turbine wheels. These nozzles can be controlled either conjointly or independently to reverse the direction of rotation of the turbines 16 and 18.

On each of the drive shafts 36 and 38 are disposed brake drums 40 and 42 which have associated therewith brake bands 44 and 46. Conventional control means may be provided to actuate the brake bands 44 and 46 independently or in unison.

The inner ends of the drive shafts 36 and 38 are coupled by a steering regenerator unit 48. Figure 2 discloses the construction of the preferred form of the steering regenerator and its connection with the drive shafts. Only one drive shaft 36 is shown as the other shaft 38 is identical. The drive wheel 20 has sprocket teeth 23 and it is held in position by a nut 25 threadably received on the end of the shaft 36. Snap rings 27 are used to locate the sprocket wheel 20, the brake drum 40, and the drive gear 31 of the drive gear train 32. Each of these elements are either splined or keyed to the shaft 36.

A grounded casing 100 forms the structural frame for the steering regenerator 48. Juxtaposed within the unit are the drive shafts 36 and 38 which are rotatably supported as by roller bearings 102 and 104. A planetary gear unit is mounted at the inner end of each of the shafts 36 and 38. The end of the shaft 36 has secured thereto a planet gear carrying member 106 which has a planet gear 108 rotatably mounted thereto by means of a shaft 110 parallel to and spaced apart from the shaft 36. The end of the drive shaft 38 has similar construction associated with it, including a planet carrier 112, a shaft 114 and a planet gear 116. A ring gear 126 engages the planet gears 116 of that planetary gear set. A cylindrical flange 118 forms an extension on the planet carrier 112 and has internal gear teeth 120 which form a ring gear for the planet gears 108 of shaft 36. The outer end of the planet gear shaft 110 is secured to a cup-shaped member 122, which has its inner end 123 rotatably mounted by means such as a roller bearing 124 and its outer end 125 secured to the ring gear 126 as by bolts 128.

The aforedescribed construction provides two planetary gear sets associated with the juxtaposed drive shaft ends and with a planet gear carrying member attached to the end of each of the drive shafts, said members forming a part of or being connected to the ring gear of the other planetary gear set.

Sun gears 130 and 132 are journalled on the shafts 36 and 38 respectively, as by needle bearings 134 and 136. Sun gear 130 engages the planet gear 108 at its inner end and has disk brake members 138 splined to its outer end. Sun gear 132 similarly engages its planet gear 116 and brake members 140. Brake elements 142 are splined at 144 to the frame 100 of the unit. In the brake associated with shaft 38 brake elements 146 are splined to the frame 100 as at 148.

Separate actuating means are provided to independently engage the brakes and lock the sun gears against rotation. Piston 150 is slidably mounted within a complimentary cylinder 152. Hydraulic pressure means not shown are provided to cause the piston to move against the brake clutching elements 138 and 142 so that sun gear 130 may be held stationary with respect to the frame 100. A similar control piston 154 and cylinder 156 is provided to actuate the brake elements 140 and 146 so as to lock the sun gear 132. When both of the brakes are disengaged the shafts 36 and 38 rotate independently of each other, however, when one of the brakes is engaged so as to hold its sun gear stationary, a gear ratio is established between the two shafts 36 and 38.

In operation gas generated within the unit 10 is transmitted equally through the nozzles 52 and 54 to the power turbines 16 and 18. The shaft output of these turbines 16 and 18 then passes through the reduction gears 24 and 26, the transmissions 28 and 30, the drive gear trains 32 and 34 and to the sprocket drive wheels 20 and 22. In normal driving of the vehicle the gas will be distributed equally to the two turbines 16 and 18, however, for purposes of directional control when sharp turns are not required, valve 50 may be manipulated so as to provide a disproportionate amount of power to one side of the drive line. The inequality of power will cause one side of the drive line to speed up and the other slow down, thus changing the direction of the vehicle.

Directional control is also possible by means of the nozzles 52 and 54. By changing the direction at which the gases strike the turbine wheel the shaft rotation of the turbines can be reversed. By providing independent manipulation of the nozzles 52 and 54, opposite rotation of the turbines 16 and 18 can be obtained which would result in the vehicle executing a pivot turn as each of its sprocket driven tracks will be rotating in a different direction.

As additional control over vehicle movement the brakes 40 and 42 provide a stopping means, however, means may be provided for their independent actuation so that a slewing type of turn may be employed.

However, in any case, the most efficient turn will be achieved by using the steering regenerator 48. To execute a turn with this mechanism the brake 138, 142 or 140, 146 on the side of the vehicle toward which it is desired to turn is locked. This establishes a gear ratio between the shafts whereby the outer shaft turns at a greater rate than the inner shaft.

When the clutch is engaged the track on the inside immediately attempts to slow down and starts to drag on the ground. This causes a torque reversal in the drive axle on this side which is exerted through the regenerator gearing on the outside track axle which is attempting to speed up. Thus the retarding affect of the ground on the inside track is utilized to help speed up and maintain the required increased speed of the outside track.

The locking of one of the brakes causes the shafts 36 and 38 to be connected through a geared ratio because locking of the sun gear of one of the planetary sets establishes a reaction force for the planet gear of that set, in which case forces are transmitted from the slower or inner shaft to the planet carrier thereby causing the planet gear to react against the locked sun gear and force the ring gear to rotate at a greater rate. The ring gear is attached to the outer drive shaft, therefore the outer shaft rotates at a greater speed than the inner drive shaft.

The present invention may take an alternate form wherein the gearing of the regenerative steering connection between the two drive shafts is as illustrated in Figure 3. There the two planetary gear sets are connected by having the sun gear of each set joined with the planet carrier of the other set. This is in place of the planet carrier to ring gear connection of Figure 2.

The arrangement of Figure 3 has right and left drive axles 236 and 238 which have their inner ends joined by the regenerative steering connection 48. The outer ends of each shaft are similarly equipped and for the sake of brevity, only the left-hand axle 238 is shown and described. Positioned on the axle 238 is a gear 35 which forms the last gear of the reduction gear train 34. Disposed outwardly of gear 35 is a brake drum 42 and an actuable brake band 46 therefor. Secured to the outermost end of the shaft 238 is a driving wheel 22 which has sprocket teeth 21 arranged about the periphery thereof for engagement with the vehicle's left track. The right drive axle 236 also has a driving gear, brake and brake drum and a driving sprocket associated with it. The operation of this mechanism at the outer ends of axle shafts 236 and 238 is identical to that previously described in association with the device of Figure 2.

The regenerative steering unit 48 of Figure 3 is composed of two conventional planetary gear sets in parallel relationship and joining the inner ends of drive axles 236, 238. Near the inner end of shaft 238 is a spider-shaped planet carrier 212 affixed thereto. Secured to the planet carrier 212 are a plurality of pinion shafts 214 upon which are journaled planet gears 216. Rotatably mounted and in mesh relationship about the cluster of sun gears 216 is a ring gear 226. A brake band 248 is provided in association with the ring gear 246 and is actuatable to hold ring gear 226 stationary. Journaled about the drive axle 238 is a sun gear 232 which meshes with planet gears 216. Sun gear 232 has a bearing portion 233 coaxial about the axle shaft 238. A spider-shaped planet carrier 206 is disposed at the opposite end of bearing portion 233 from the sun gear 232 and is affixed to rotate therewith.

The inner end of axle shaft 236 has a spider-shaped planet carrier 222 secured thereto. Affixed to and between the planet carriers 206 and 222 are a plurality of pinion shafts 210 upon which are journaled planet gears 208. Rotatably mounted and in mesh relationship about this cluster of planet gears 208 is a ring gear 218. A brake band 242 is provided in association with the ring gear 218 and is actuable to hold ring gear 218 stationary. Secured to the innermost end of axle shaft 238 is a sun gear 230 which meshes with the planet gears 208.

The device of Figure 3 is composed of two ordinary planetary gear sets with which there are associated two drive axle shafts. The brake bands constitute a means for selectively establishing which planetary gear set will form the connection between the two axle shafts.

In operation brake bands 242 and 248 provide the means to secure the ring gears 218 and 226 of each of the planetary gear sets from rotation and thus establish a reaction member for the transmission of force from the shaft of one side of its planet carrier, the planet gears thereon and to the sun gear in mesh therewith which in turn is affixed to the other drive axle. For example, when band 242 is tightened against ring gear 218, the ring gear 218 becomes stationary. A positive fixed gear ratio is then established between the axle shafts 236 and 238 that is determined by the pitch diameters of sun gear 230 and planet gears 208 which form the path for transmitting force from axle 238 to the planet carrier 222 of axle shaft 236.

Similarly, when brake band 248 is secured against ring gear 226, it becomes a reaction member so that forces may be transmitted from sun gear 232 to planet gears 216. The complete path is from axle shaft 238, to the planet carrier 212, to planet gears 216, to sun gear 232, to bearing portion 233, to planet carrier 206, to planet carrier 222 and finally to drive axle 236.

When brake bands 242 and 248 are not actuated the elements of the steering regenerator 48 have no reaction member and thus they merely windmill. A fixed gear ratio is only established when one or the other of the two brake bands 242, 248 are engaged. If both brake bands 242, 248 are engaged simultaneously, a mechanical lock occurs and both shafts 236, 238 are held against rotation.

Both of the gearing arrangements of Figure 2 and Figure 3 operate in a similar fashion, however, the planet carrier to ring gear connection of Figure 2 is preferred to the planet carrier to sun gear connection of Figure 3 as a greater gear ratio can be established with the former than with the latter while still maintaining a unit dimension within reason.

In either example when both of the regenerative steering unit brakes are engaged simultaneously, the elements within the unit become locked so that no rotation of either shaft is possible. With both brakes disengaged, the unit becomes an unrestrained kinematic chain so that each shaft is free to rotate independently of the other.

While the invention of the present application has been described in connection with specific structural elements, it is to be understood as being for illustrative purposes only and it will be obvious to one skilled in the art that other corresponding structures may be substituted or interchanged and still be within the scope of the present invention.

We claim:

1. In a track laying vehicle having two independent drive axles, separate power means engaging each of said drive axles, a steering regenerator coupling said drive axles, said regenerator comprising two planetary gear sets, one of said sets being associated with each of said axles, each of said axles being secured to the planet carrier of its associated gear set and to the ring gear of the other planetary gear set, brake means to independently secure the sun gear of each of said units against rotation.

2. Steering means for a track laying vehicle including a power fluid expelling gas generator, separate power turbines and drive axles, valve means for controlling the proportionate distribution of power fluid to said power turbines, drive line means connecting said turbines and said axles, a steering regenerator coupling said drive axles, said regenerator including separate planetary gear sets each having planet gears, a planet gear carrier and concentric first and second gear members each independently engaging said planet gears, one of said axles being secured to the planet carrier of one of said sets and the other of said axles being secured to the first gear member of said one set, and brake means actuatable to secure the second of said gear members against rotation.

3. In a track vehicle having independent drive axles, separate power turbine means each engaging one of said drive axles, a steering regenerator coupling said drive axles, said regenerator comprising two planetary gear sets, one of said sets being associated with each of said axles, each of said planetary gear sets containing in meshed relationship sun, planet and ring gears and a planet carrier, each of said axles being secured to the planet carrier of its associated gear set and the ring gear of the other planetary gear set, brake means to independently secure the sun gear of each of said sets against rotation.

4. In a track laying vehicle having independent drive axles, separate power means engaging each of said drive axles, a steering regenerator coupling said drive axles, said regenerator comprising a plurality of planetary gear sets, each of said sets containing in meshed relationship sun, planet and ring gears and a planet carrier, one of said sets being associated with each of said axles, each of said axles being secured to the planet carrier of its associated gear set and the sun gear of the other planetary gear set, brake means to independently secure the ring gear of each of said sets against rotation.

5. In a track laying vehicle having a plurality of drive axles, separate propulsion means engaging each of said drive axles, a steering regenerator coupling said drive axles, said regenerator comprising planetary gear sets, one of said sets being associated with each of said axles, said planetary gear sets each containing in meshed relationship planet gears, planet gear carriers, and two gear members each independently engaging said planet gear, each of said axles being secured to the planet carrier of its associated gear set, each said planet carriers being secured to the first of the gear members of the other planetary gear set, brake means to independently secure the second of said gear members of either set against rotation.

6. In a track laying vehicle having two independent drive axles, separate power means engaging each of said drive axles, a steering regenerator coupling said drive axles, said regenerator comprising two planetary gear sets, one of said sets being associated with each of said axles, each of said axles being secured to complimentary operative members of their respective gear sets and to complimentary operative members of the other gear set, and clutching means for independently and selectively securing one of the operative members of at least one of said gear sets against rotation.

7. A mechanism for joining a pair of drive axles comprising a pair of planetary gear sets, said sets each having a planet gear, a planet gear carrier, and concentric first and second gears independently engaging said planet gear, each of said axles being secured to rotate with the planet gear carrier of one of said gear sets and being secured to rotate with the first gear of the other said gear sets, and brake means to selectively secure said second gear of each of said sets against rotation.

References Cited in the file of this patent

UNITED STATES PATENTS

| | | |
|---|---|---|
| 1,318,189 | Tritton | Oct. 7, 1919 |
| 2,254,335 | Vincent | Sept. 2, 1941 |
| 2,268,601 | Knox | Jan. 6, 1942 |
| 2,353,554 | Gates | July 11, 1944 |
| 2,585,790 | Kelley | Feb. 12, 1952 |
| 2,630,025 | Lapsley | Mar. 3, 1953 |
| 2,689,488 | Storer et al. | Sept. 21, 1954 |
| 2,730,182 | Sloane | Jan. 10, 1956 |
| 2,757,513 | Banker | Aug. 7, 1956 |